United States Patent
Pettitt

(10) Patent No.: US 8,027,108 B2
(45) Date of Patent: Sep. 27, 2011

(54) SYSTEM AND METHOD FOR PROJECTION SYSTEMS USING SEQUENTIAL COLOR TECHNIQUES

(75) Inventor: Gregory S. Pettitt, Farmersville, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1114 days.

(21) Appl. No.: 11/398,244

(22) Filed: Apr. 5, 2006

(65) Prior Publication Data
US 2007/0236616 A1    Oct. 11, 2007

(51) Int. Cl.
*G02B 5/22* (2006.01)
(52) U.S. Cl. .......................... 359/891; 353/20
(58) Field of Classification Search ............ 353/84, 353/31, 20; 348/743; 359/891, 771, 502
See application file for complete search history.

(56) References Cited

U.S. PATENT DOCUMENTS

| 1,794,727 A * | 3/1931 | O'Grady ................... 352/66 |
| 7,379,123 B2 * | 5/2008 | Willis ....................... 348/742 |
| 2005/0280745 A1 * | 12/2005 | Takeda et al. .......... 348/771 |

* cited by examiner

*Primary Examiner* — Que T Le
*Assistant Examiner* — Jerry Brooks
(74) *Attorney, Agent, or Firm* — Charles A. Brill; Wade James Brady, III; Frederick J. Telecky, Jr.

(57) ABSTRACT

A projection system using a sequential color filter is provided. The sequential color filter utilizes various colors, such as red, blue, and green, divided into segments to produce images. Each color may be divided into two or more segments and arranged such that high sequential color rates may be obtained to help reduce the rainbow effect. The colors may be arranged such that the sequential color filter is symmetrical in the sense that the sequential color filter is divided into approximately equal regions wherein each region has approximately an equal amount of respective colors.

20 Claims, 2 Drawing Sheets

| SEGMENT(S) | SIZE (INCLUDING SPOKE REGIONS) |
|---|---|
| BLUE 210 AND 211 | 54 DEGREES |
| RED 212 AND 213 | 36 DEGREES |
| RED 214 | 60 DEGREES |
| GREEN 215 AND 216 | 33 DEGREES |
| GREEN 217 | 54 DEGREES |

SYSTEM AND METHOD FOR PROJECTION SYSTEMS USING SEQUENTIAL COLOR TECHNIQUES

TECHNICAL FIELD

The present invention relates generally to projection systems and, more particularly, to projection systems using sequential color techniques.

BACKGROUND

Many projection systems, such as digital light projectors (DLPs), utilize a white light and a color filter wheel to produce different colors. The color filter wheel, which typically includes segments for each of the primary colors red, blue, and green, spins at a predetermined rate as the white light is projected onto the color filter wheel. As the white light passes through the color filter wheel, only certain wavelengths are allowed to pass through the various segments of the color filter wheel, thereby producing colored lights corresponding to the colors of the color filter wheel. An integrator receives the colored light and projects the colored light toward a viewing surface. Lenses and/or mirrors may be added as necessary to focus the light.

When the distinct colors of the color filter wheel are projected onto the viewing surface at a fast rate, the human eye integrates the color to form other colors, such as combining blue and red to form purple. Various colors and shades may be formed by altering the amount of light (length of time) each color is projected.

Because the colors are projected individually and the human eye integrates the different colors to form other colors, the displayed image may contain certain artifacts. One such artifact is referred to as the rainbow effect. This effect is typically seen along the edges of an object when the viewer moves or sweeps their eyes across the viewing angle. In these instances, some viewers are able to see the separate colors of the color wheel along the edges, which appear similar to a rainbow along the edges. When using a red, blue, and green color filter wheel, the rainbow primarily consists of red and green colors—the darker blue color is not observed as often.

One attempt to solve this problem involved spinning the color filter wheel at a higher rate. For example, to produce an image at a 60 Hz rate, the color filter wheel may be spun at a 120 or 240 Hz rate. It has been found that spinning the color filter wheel at a higher rate allows more samples of the various colors to be produced within a given period of time. The color bands are now smaller and are more difficult for the human eye to separate the individual colors.

Spinning the color filter wheel at a higher rate, however, may cause problems. For example, the higher the spin rate, the more difficult it may be to control the electrical and mechanical operations of the projection system. Therefore, there is a need for a system and method for using sequential color techniques in a projection system that may reduce the rainbow effect.

SUMMARY OF THE INVENTION

These and other problems are generally reduced, solved or circumvented, and technical advantages are generally achieved, by embodiments of the present invention, which provides a system and method for projection systems using sequential color techniques.

In an embodiment of the present invention, a sequential color filter, such as a color filter wheel, is provided. The sequential color filter divides one or more of the colors into multiple segments. In an embodiment utilizing red, blue, and green filters, the red and green filters are divided into three segments, wherein the sum of the size of two of the segments is approximately equal to the size of the third segment.

In another embodiment, the color segments are arranged into regions such that an approximately equal amount of each color is included within each region, thereby enabling the sequential color filter to be compatible with SmoothPicture™ technology.

In yet another embodiment, the sequential color filter is part of a projection system. In this embodiment, a lamp is positioned such that light is emitted through the sequential color filter. The filtered or colored light is directed onto a viewing surface by an integrator. A controller is communicatively coupled to the sequential color filter and the integrator to control the image. Other components, such as lenses, may be used to focus the light as necessary.

It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 1:
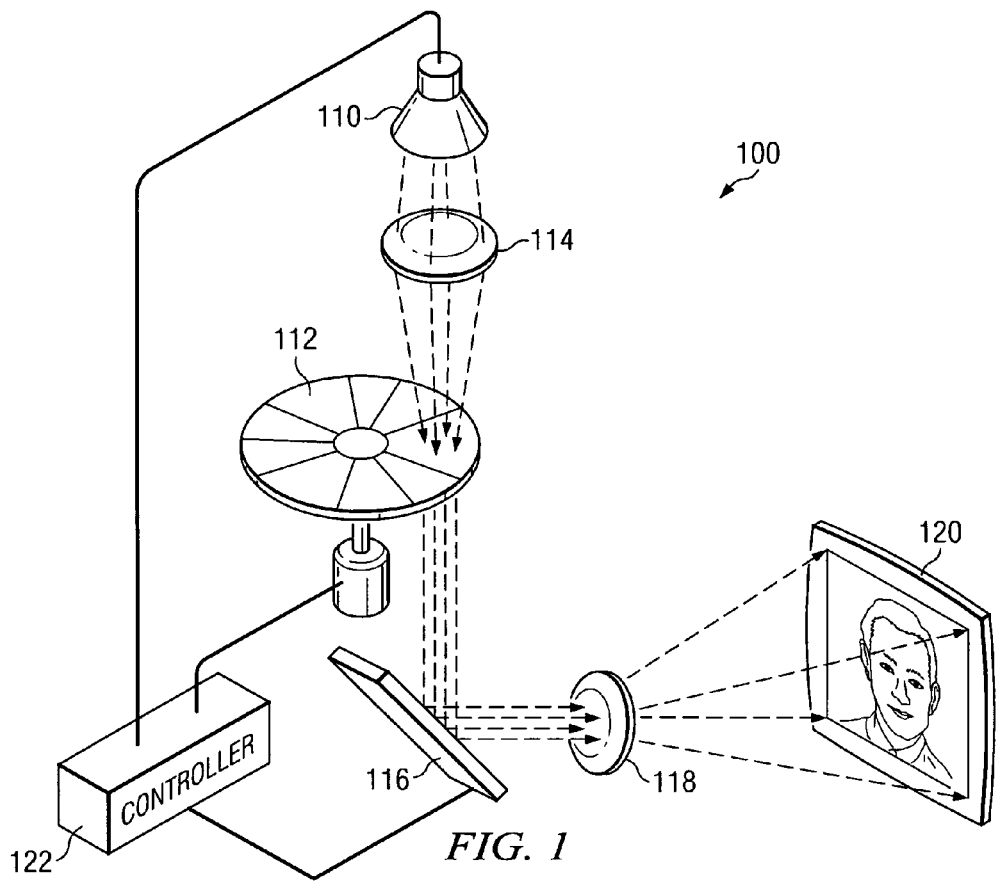
FIG. 1 is a system diagram of a projection system utilizing sequential color techniques in accordance with an embodiment of the present invention.

FIG. 1 illustrates a projection system 100 in accordance with an embodiment of the present invention. The projection system 100 comprises a light source 110, such as a lamp, positioned such that light emitted from the light source 110 is directed to a sequential color filter 112. One or more lenses, such as lens 114, may be positioned between the light source 110 and the sequential color filter 112 to aid in focusing the light emitted from the light source 110 on the sequential color filter 112.

In an embodiment, the sequential color filter 112 is a color filter wheel having red, blue, and green segments arranged in segments in a circular manner. By combining light of these three primary colors, other colors may be created. Color filter wheel 112 may have other colors, including white (or clear) segments that may be used to increase the brightness or wash out another color. A color filter wheel that may be used in accordance with an embodiment of the present invention is discussed in greater detail below with reference to FIG. 2.

A light modulator 116 directs the light from the light source 110 to one or more lenses, such as lens 118, which projects the image onto a viewing surface 120. One example of a suitable light modulator 116 is a digital micromirror device (DMD) produced by Texas Instruments of Dallas, Tex. Other components, however, may be used. The projection system 100 may also include a controller 122 communicatively coupled to one or more of the devices, such as the light source 110, sequential color filter 112, and light modulator 116 as illustrated in FIG. 1. The controller 122 may also be communicatively coupled to other devices, such as one or more lenses.

In operation, light (e.g., white light) is emitted from the light source 110 through the lens 114 toward the sequential color filter 112. In embodiments in which the sequential color filter 112 is a color filter wheel, the color filter wheel spins, thereby passing colored light corresponding to the colors of the sequential color filter 112 onto the light modulator 116. The light modulator 116, controlled by the controller 122, modulates the colored light signal onto the lens 118 and the viewing surface 120. By combining the different colored lights in a specific manner, different colors may be formed on the viewing surface 120.

It should be noted that the projection system 100 is provided as an illustrative embodiment of the present invention only and is not meant to limit other embodiments of the invention. Not all components of a projection system have been shown, but rather the elements necessary for one of ordinary skill in the art to understand concepts of the present invention are illustrated. For example, the projection system may include additional optical devices (e.g., mirrors, lenses, etc.), additional electronics (e.g., power supplies, sensors, etc.), light sinks, and the like. Furthermore, one of ordinary skill in the art will realize that numerous modifications may be made to the projection system 100 within the scope of the present invention. For example, while the sequential color filter 112 is portrayed as a transmissive filter, an embodiment of the present invention may utilize a reflective filter.

Figure 2:
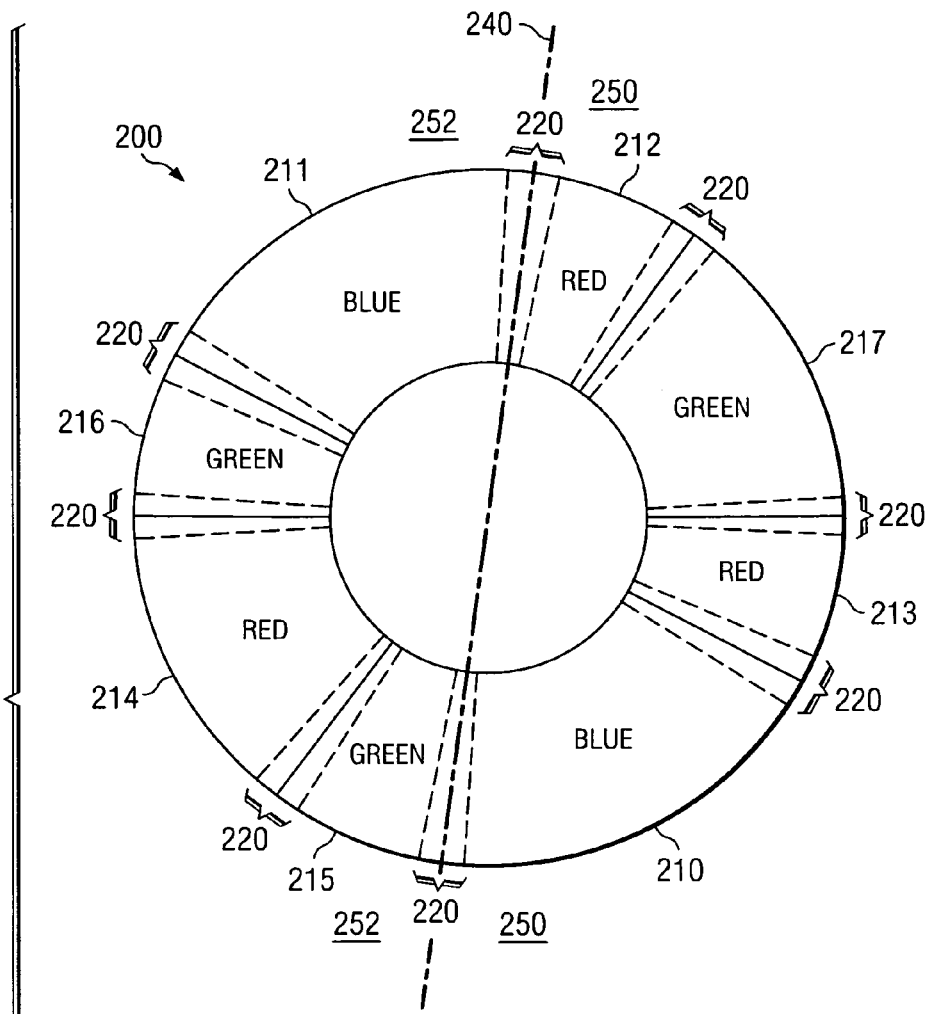
FIG. 2 is a plan view of a color filter wheel in accordance with an embodiment of the present invention.

FIG. 2 is a plan view of a color filter wheel 200 in accordance with an embodiment of the present invention. As an initial matter, it should be noted that the embodiment discussed herein utilizes a color filter wheel (such as the color filter wheel 200 of FIG. 2) as the sequential color filter 112 of FIG. 1 for illustrative purposes only. In other embodiments, the sequential color filter 112 may be a rotating or stationary polygon, linear shapes, or the like.

As illustrated in FIG. 2, the color filter wheel 200 is separated into eight segments comprising two blue segments 210 and 211, three red segments 212, 213, and 214, and three green segments 215, 216, and 217. Spoke regions 220 are positioned between each of the color segments. Generally, the spoke regions 220 represent regions in which the light will not be a single color, but rather will be blended with adjacent segments of light due to the size of the light beam. For example, as the color filter wheel is rotated such that a light beam (not shown) intersects the color filter wheel at a predetermined point, when the center of the light beam crosses the edge of the spoke region 220 between the red segment 212 and the green segment 217, the resulting light will be a combination of red and green. The resulting light will remain a combination of red and green until the center of the light beam crosses the next sequential edge of the spoke region 220 between the red segment 212 and the green segment 217.

In an embodiment, the red segments 212 and 213 are approximately one-half the red segment 214, and likewise, the green segments 215 and 216 are approximately one-half the green segment 217. The two blue segments 210 and 211 are approximately equal. In this embodiment, the width of each segment is measured by the amount of unmixed light available in each color segment, i.e, the width of each segment is measured excluding the portion of the segment within the spoke regions 220. It should be noted, however, that the spoke regions 220 may be used for light recapture to increase the brightness of a color.

The table illustrated in FIG. 2 provides an example of the sizes of each of the segments 210-217. The sizes (in degrees) assume that the spoke regions are 12°. In this embodiment, the red segments 212 and 213 are each about 36°, or about half of the red segment 214, which is about 60° less than the relevant spoke region 220. Likewise, the green segments 215 and 216 are each about 33°, or about half of the green segment 217, which is about 59° less than the relevant spoke region 220. The blue segments 210 and 211 are each about 54°.

One of ordinary skill in the art will realize that dividing the color segments in this manner increases the color sequential rate, thereby reducing the rainbow effect. Generally, the color sequential rate is the rate at which the color segments change within a given period of time, e.g., within a 60 Hz time period. As discussed above, one method of increasing the color sequential rate is to increase the rate at which the color filter wheel spins. However, increasing the spinning rate often creates problems controlling the electrical and mechanical mechanisms of the display system to accurately control the color. Dividing the colors into more segments increases the effective spinning rate, allowing more samples of a color to be projected within a given period of time and decreasing the rainbow effect.

In another embodiment, one or both of the blue segments 210 and 211 may also be divided into smaller segments. However, it has been found that blue light is not as noticeable in the rainbow effect, and as such, it may be unnecessary to further divide the blue segments 210 and 211.

In yet another embodiment, one or more white (or other colors) segments may be added if it is desirable to increase the brightness and/or contrast of the colors. White light may be used to increase the lumens used to create the various colors. Increasing the lumens increases the brightness and contrast levels of the projected image.

It should be noted that the embodiment of the present invention illustrated in FIG. 2 is compatible with SmoothPicture™ technology. Generally, SmoothPicture™ technology utilizes a light modulator 116 (FIG. 1) such as a DMD having half the pixels as that being displayed. A higher resolution is obtained by displaying a first image (referred to as a first sub-frame), shifting the projected pixels, and then displaying a second image (referred to as a second sub-frame). While two sub-frames are used in this example, SmoothPicture™ systems may use three or more sub-frames. In this manner, the pixel count is effectively doubled, thereby creating smoother lines. Because multiple sub-frames are displayed, it is preferred that the amount of available colored light for each sub-frame be approximately equal.

Accordingly, in a preferred embodiment, the color filter wheel 200 is divided into regions such that each region comprises an approximately equal amount of each corresponding color. For example, the color filter wheel 200 of the embodiment illustrated in FIG. 2 is divided into a first region 250 and a second region 252, as indicated by the dotted line 240. The first and second regions 250 and 252 are symmetrical in the sense that each has an equal amount of area for each of the colors blue, red, and green. In this embodiment, the first region 250 has two red segments 212 and 213 whose sum is approximately equal to the red segment 214 in the second region 252, and the second region 252 has two green segments 215 and 216 whose sum is approximately equal to the green segment 217 in first region 250. Blue segments 210 and 211 are approximately equal in size.

One skilled in the art will realize that by dividing the color filter wheel into regions comprising an approximately equal amount of each color, the color filter wheel may be rotated at any appropriate speed. For example, the color filter wheel may be spun at a 60 Hz rate (3600 RPM) wherein the first region 250 is used to generate the first sub-frame and the second region 252 is used to generate the second sub-frame. By increasing the rate at which the color filter wheel rotates to two rotations per 60 Hz period (7200 RPM), two regions are used to generate each sub-frame, reducing the rainbow effect while achieving a higher pixel resolution. The rate may also be increased to rotate three times for each 60 Hz period, wherein three segments are used to generate each of the sub-frames. Higher spinning rates may be used in a similar manner.

Figure 3:
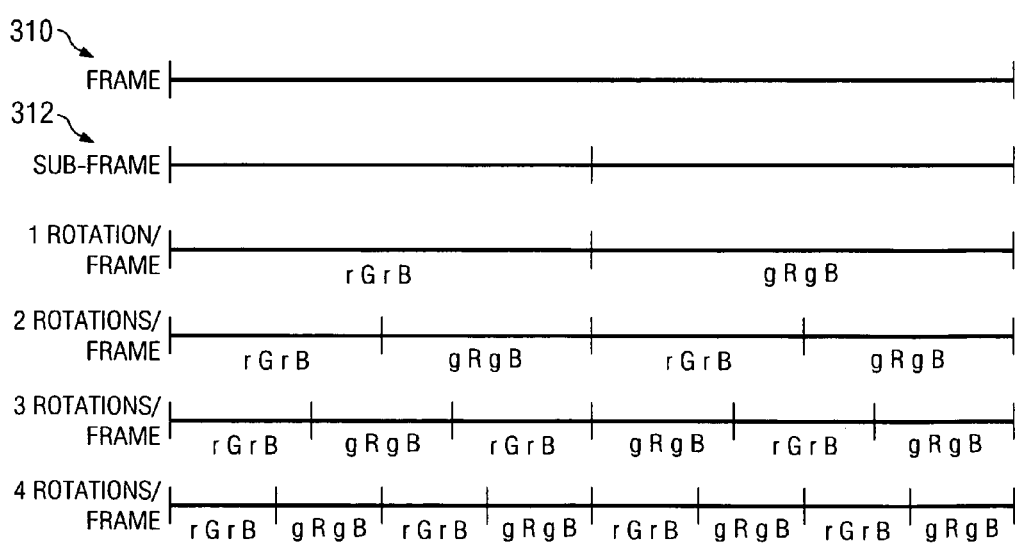
FIG. 3 is an example of colors that may be displayed at various rotation speeds in accordance with an embodiment of the present invention.

FIG. 3 illustrates the use of a color filter wheel such as that illustrated in FIG. 2 to generate multiple sub-frames. In this embodiment, each frame 310 is divided into two sub-frames 312, wherein each frame represents a single 60 Hz period. As noted above, it is generally accepted that the human eye will integrate images generated at a rate of 60-times per second, giving the viewer the perception of smooth, continuous movement.

Below the sub-frames 312 are four examples of four different spin rates, namely 1 rotation/frame, 2 rotations/frame, 3 rotations/frame, and 4 rotations/frame. Each example has vertical dividers indicating the length of time it takes to rotate the color filter wheel 200 of FIG. 2 one-half rotation, or one of the regions 250 and 252. Below each division is the color segments that are displayed in that time slot, wherein the letters R, B, and G represent the red, blue, and green color segments, respectively. Capital letters indicate a relatively large segment (e.g., segments 217, 210, 214, 211 of FIG. 2), and small-case letters indicate a relatively small segment (e.g., segments 212, 213, 215, and 216 of FIG. 2).

In each example, it is assumed that the frame begins with segment 212 of FIG. 2 and rotates clockwise. In the first example of 1 rotation/frame, one region is used for each sub-frame. It should be noted, in this example as well as the other examples, that the total amount of each color is approximately equal in each sub-frame, thereby allowing for the generation of the same colors in each sub-frame. It should be noted, however, that in this example the rainbow effect may be a problem and a higher rotation rate may be desirable to reduce the rainbow effect. The remaining examples increase the rotations/frame. It should be noted that the total amount of time for each color is approximately the same, but that the number of times each color is displayed increases to help reduce the rainbow effect.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A color filter wheel comprising:
   a first region; and
   a second region separated from the first region by a boundary between adjacent filter segments in the first region and the second region such that the second region has an equal size as the first region, the first region and the second region each including one or more segments of a first color and one or more segments of a second color, the first region and the second region having different numbers of segments of the first color and different numbers of segments of the second color, and wherein no filter segment has the same color as an adjacent filter segment sharing a common border.

2. The color filter wheel of claim 1, further comprising an equal number of blue segments in the first region and the second region.

3. The color filter wheel of claim 1, wherein the first color is red and the second color is green.

4. The color filter wheel of claim 1, wherein a first sum of an angular span of the segments of the first color in the first region is approximately equal to a second sum of an angular span of the segments of the first color in the second region, and a third sum of an angular span of the segments of the second color in the first region is approximately equal to a fourth sum of an angular span of the segments of the second color in the second region, wherein the sums exclude spoke regions.

5. The color filter wheel of claim 1, further comprising one or more white color segments.

6. A method of forming an image, the method comprising:
   transmitting a light through a color filter wheel generating a filtered light, the color filter wheel having a first region and a second region, the first region being equal in size to the second region and separated from the second region by a boundary between adjacent filter segments in the first region, the first region and the second region each including one or more segments of a first color, one or more segments of a second color, and one or more segments of a third color, the number of segments of at least one of the colors being different in the first region than the second region, and wherein no filter segment has the same color as an adjacent filter segment sharing a common border; and
   generating an image with the filtered light.

7. The method of claim 6, wherein the first region includes one segment of the first color, two segments of the second color, and one segment of the third color, and the second region includes two segments of the first color, one segment of the second color, and one segment of the third color.

8. The method of claim 7, wherein the first color is red, the second color is green, and the third color is blue.

9. The method of claim 6, wherein the generating is performed by modulating the filtered light onto a viewing surface.

10. The method of claim 9, wherein the modulating is performed at least in part by a digital micromirror device (DMD).

11. The method of claim 6, wherein a sum of an angular span of segments of the first color in the first region is approximately equal to a sum of an angular span of segments of the first color in the second region, excluding spoke regions.

12. The method of claim 11, wherein a sum of an angular span of segments of the second color in the first region is approximately equal to a sum of an angular span of segments of the second color in the second region, excluding spoke regions.

13. The method of claim 6, the color filter wheel further comprising one or more white color segments.

14. A projection system comprising:
- a light source configured to emit a beam of light;
- a color filter wheel positioned in a path of the beam, the color filter wheel having a first region and a second region, the first region being equal in size to the second region and separated by a boundary between adjacent filter segments in the first region and the second region, each region having a first color, a second color, and a third color, the first region having one segment of the first color and the second region having two segments of the first color, the second region having one segment of the second color and the first region having two segments of the second color, and wherein no filter segment has the same color as an adjacent filter segment sharing a common border.

15. The projection system of claim 14, wherein the first color is red, the second color is green, and the third color is blue.

16. The projection system of claim 14, further comprising a modulator that modulates filtered light onto a viewing surface.

17. The projection system of claim 16, wherein the modulator comprises a digital micromirror device (DMD).

18. The projection system of claim 14, wherein a first segment of the first color is approximately equal in size to a sum of a second segment of the first color and a third segment of the first color, excluding spoke regions.

19. The projection system of claim 14, wherein the color filter wheel further comprises one or more white color segments.

20. The projection system of claim 14, wherein the first region and the second region are approximately equal in size.

* * * * *